June 23, 1953
S. L. THOMAS
2,642,744
ADJUSTABLE MEASURING CUP
Filed July 14, 1948
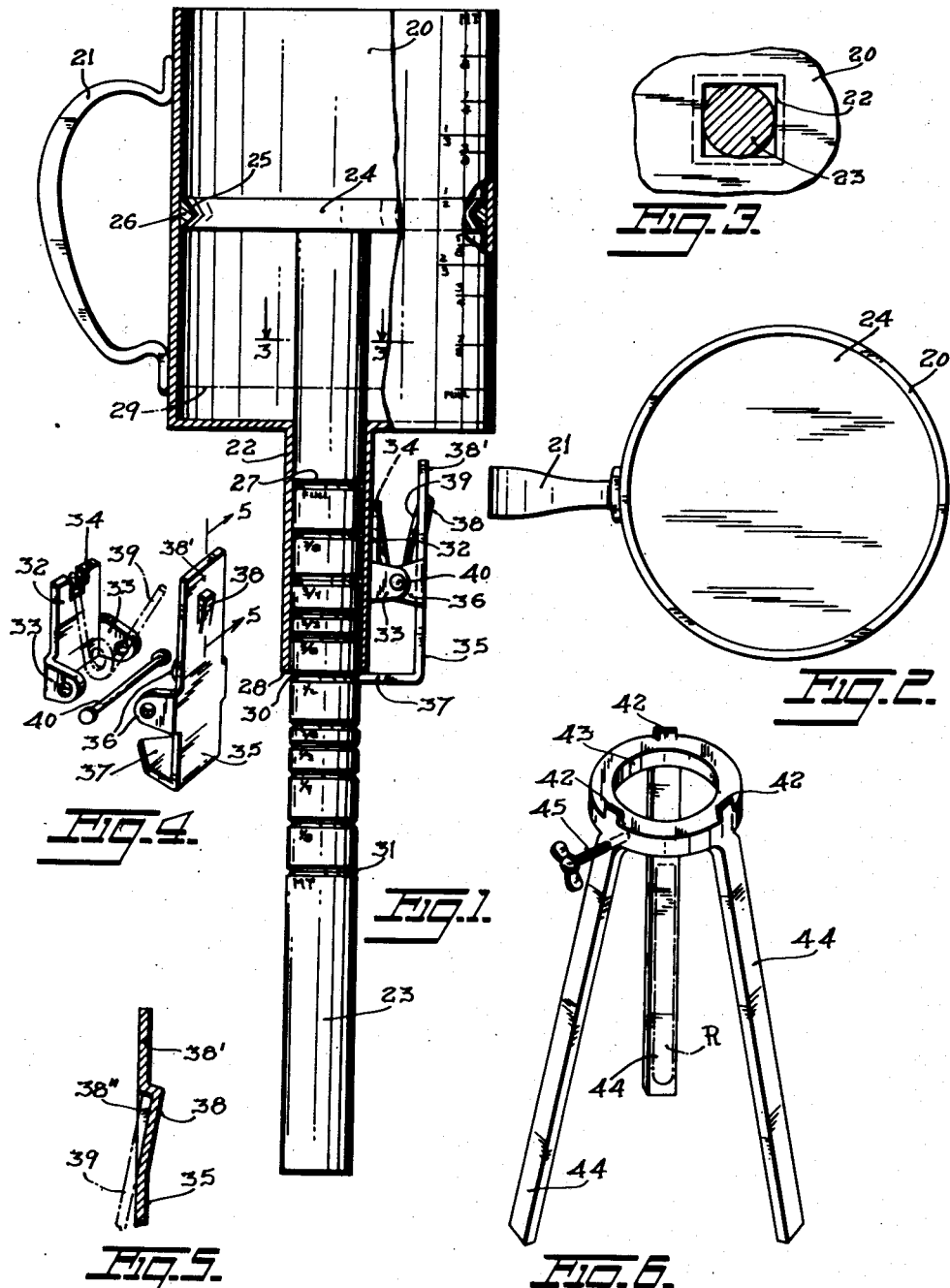
INVENTOR.
SAMUEL L. THOMAS
BY
ATTORNEY

Patented June 23, 1953

2,642,744

UNITED STATES PATENT OFFICE 2,642,744

ADJUSTABLE MEASURING CUP

Samuel L. Thomas, Woodside, N. Y.

Application July 14, 1948, Serial No. 38,641

2 Claims. (Cl. 73—429)

This invention relates to new and useful improvements in adjustable measuring cups, and, more particularly, the aim is to provide a novel and valuable device of the class indicated which can be practicably used for measuring not only non-fluent or stiffly fluent substances such as butter, ice cream, lard, or any other substance of a nature more viscous or plastic than a freely flowable one, but which is adapted for use with convenience and dispatch in measuring such a freely flowing material as milk, cream, water or any other substance characterizable as a true liquid, and also in measuring a granulated or powdered material of any kind.

An object of the invention is to provide a measuring device of practically universal utility as just explained, and also a device which can be manufactured at relatively small expense and so saleable at a comparatively low price, but nevertheless which is provided with features of unique value in precisely setting the device for a desired measurement and with features of like value in ejecting a substance measured which is more of a plastic than a freely flowable nature; and a device, moreover, which is readily separable as to all parts ever touching the material measured, to facilitate washing and sterilization of the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 shows an embodiment of the invention as now favored, partially in elevation and partially in section.

Fig. 2 is a top plan view thereof.

Fig. 3 is a fragmentary horizontal section, taken on the line 3—3 of Fig. 1.

Fig. 4 is an exploded view, showing the components of a latch means.

Fig. 5 is an enlarged detail view, being a section taken on the line 5—5 of Fig. 4.

Fig. 6 shows in perspective a portable stand for use with a measuring cup according to the invention; a portion of the measuring rod for such a cup being fragmentarily indicated in dot and dash lines.

In the first form of the invention illustrated in Figs. 1–5, the measuring cup 20 is shown as having a cylindrical interior, that is, of the same interior circular cross-section from top to bottom; which cup may be provided with a handle 21. Rigidly depending from the center of the circular bottom wall of the cup is a tubular sleeve 22, of square cross-section. Extended downward through the sleeve 21 is, in effect, a piston rod 23 suitably fixedly carrying at its top a piston 24.

The piston 24 has an annular groove 25, such groove so present that the periphery of the piston, at the outer limits of said groove, is in agreement with a piston diameter such that said periphery will form a barrier for limiting entrance of such a substance as butter, or the like, or flour or the like, to that part of the cup interior which at any adjustment of the device, may be below the top surface of the piston.

One of the features of the invention is such a groove in the piston, in combination with an annular endless piston ring or gasket, as one of rubber or of some suitable odorless, tasteless, and dietarily innocuous material (such, for instance, as one of the synthetic rubbers recently developed). Such a material, as well known, is somewhat elastic and readily compressible, so that with the piston and piston-rod structure 23—24 wholly disconnected from the cup 20, or with the rod 24 thrust upward to an extent to elevate the piston above the top of the cup, said gasket, indicated in Fig. 1 at 26, may be snapped into the groove 25.

According to the compressibility and the degree of elasticity of the gasket material, the gasket may be normally of a cross-section more or less larger than but corresponding to that of the groove, or may be of any cross-section to predetermine that on forcing the gasket-equipped piston downward into the cup, the gasket will act in a liquid-tight manner yet to allow ready endwise movement of the rod relative to the cup. The cross-sectional characteristic of the groove is unimportant, provided the cross-section for the gasket is correspondingly advisedly chosen. The use of a gasket is, of course, optional; but when used it is important in adapting the device for use in precisely measuring free flowing liquids and some very finely pulverized dry materials.

The rod 23 acts also as a measuring rod, and is suitably divided along its length by a series of annular grooves, in such manner that when any one of said grooves is at an index, which index could be the bottom 28 of the sleeve 22, the piston 24, while within the cup 20, is at an elevation above the top of the bottom wall of the cup which positionally corresponds with the said groove then at said index.

The grooves on the rod 23 may be provided to any number desired, and spaced apart according to which different fractions of the capacity of the cup are to be measured by the positional relationship of the grooves to the index 28. In the case of the embodiment of the invention now being described, the grooves are so arranged that with the uppermost groove 27 at the index 28, the top of the piston 24 is at the location indicated at 29 in dot and dash lines in Fig. 1, and so the capacity of the cup is at the intended maximum, say one quart, one litre, one pound, or one kilogram; and note that, accordingly, the outside of the cup may be marked "Full," as shown.

With the groove 30 at the index 28, as in Fig. 1, the capacity of the cup would be one-half its said maximum, and in that case the calibration "½" on the rod would show just below the sleeve 22. With the groove 31 at said index, the legend "MT" (empty) would show below said sleeve. And the same in regard to settings of the piston 24 to establish the fill-capacity of the cup at the fractional values of ⅞, ¾, ⅔, ⅝, ½, ⅓, ⅜, ¼ or ⅛, with display of the appropriate marking on the rod, just below the sleeve and so at the index 28. As with regard to "Full" and "MT," the exterior of the cup may be correctly positionally inscribed with fraction-representing indicia corresponding to those on the rod.

In combination with these features, a latch means is provided which normally holds the structure 23—24 exactly at its desired setting relative to the cup 20. Said means includes a bracket 32 stamped to have a pair of apertured ears 33, and a notch 34; and an auxiliary stamping 35 formed to incorporate a pair of apertured ears 36 and integrally carrying at its bottom a latch prong 37. The stamping 35 is formed with a blister 38 to provide opposite the latter a recess 38'' for trappingly receiving one end of a torsion wire spring 39. The bracket 32 is suitably secured to the sleeve 22, and the stamping 35 is pivotally mounted thereon by means of a rivet-pin 40 sent through the apertures at the ears 32 and 35 and sleeved by the central convolution or convolutions of the spring 39. The other end of said spring is trappingly received in the notch 34 of the bracket 32.

The portion of the stamping 35 which carries the blister 38 acts as a most efficient finger-piece 38', for manually overcoming the tension of the spring 39 to retract the latch prong 37, thereby to allow the rod 23 to be endwisely moved to establish any desired adjustment of the capacity of cup 20. On release of said finger-piece, said prong snaps into the groove then opposite the bottom of the sleeve 22, for securely holding said cup-capacity adjustment.

Referring to Fig. 6, there is here shown a portable stand 41 on which a measuring structure pursuant to the invention such as that just described, is adapted to be positioned, with the bottom of the cup resting on the top of the stand; and to be held positioned thereon by three upstanding lugs 42 in such manner that the rod associated with the cup may depend therefrom at the center of the opening 43 in the stand top. Such rod in Fig. 6 is marked R; the same corresponding to the rod 23 or an equivalent. The stand is shown as having its said top supported on three legs 44. One of said legs, at the top thereof, is drilled and tapped for receiving a screw 45.

When used with the stand, the cup is supported vertically upright, for being filled, by any substance that can be poured, to the extent determined by the height of the top of the piston 24 or an equivalent. While the cup is thus supported, its piston may be adjusted to any desired height. The cup is set on the stand so that the finger piece 38' is opposite the inner end of the screw 45. Turning the screw to advance the same, releases the latch prong 37, whereupon the rod may be endwisely moved to bring any desired one of the rod grooves opposite the index 28; and then spiral retraction of the screw permits the spring 39 to act to lock the adjustment. Even in using the cup in connection with substances like butter, lard, ice cream, etc., the cup could rest on the stand while such substance is spooned or ladled into the cup and forced down into the same to properly pack the material being measured.

In regard to a material like butter or the like, with the piston raised so that its top is at the cup top, and whether the cup is or is not on the stand, all the contents of the cup may be given a thrust for sliding it off the top of the piston or, if a portion only of said contents is desired to be removed from the cup, that portion, after proper redisposition of the piston, may be exactly sliced off, as by movement of a knife or fine wire across the top of the cup through a path contained in the plane of the top of the cup.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device of the class described, comprising an open-top cup, a sleeve fixedly depending concentrically from said cup, a piston movable in said cup for varying its fill-capacity, a rod fixedly depending from said piston and slidably extended through said sleeve, a manually adjustable means for fixing the piston at any one of a predetermined number of different locations in said cup, said means including a spring-urged detent movably carried by said sleeve and a plurality of annular grooves spaced along the length of said rod and engaged by said detent, a portable stand having a substantially horizontal top in the form of a ring supported in an elevated position on legs and on which the cup bottom may be placed with said sleeve depending through the ring opening, means retaining said cup against lateral shifting relative to said ring, and a manually operable means carried by said stand near said ring for moving said detent against the urge of its spring thereby to release said adjustable means, said manually operable means comprising a screw threaded through one of said legs on the level with said detent when said cup rests on said ring to be tightened against said detent.

2. A device of the class described, comprising an open-top cup, a sleeve fixedly depending concentrically from said cup, a piston movable in said cup for varying its fill-capacity, a rod fixedly depending from said piston and slidably extended through said sleeve, a manually adjustable means for fixing the piston at any one of a predetermined number of different locations in said cup, said means including a spring-urged detent movably carried by said sleeve and a plurality of annular grooves spaced along the length of said rod and engaged by said detent, a portable stand having a substantially horizontal top in the form of a ring supported in an elevated position on legs and on which the cup bottom may be placed with said sleeve depending through the ring opening, spaced lugs extended upward from said ring for engaging the bottom of said cup holding it against lateral shifting relative to said ring, and a screw threaded through one of said legs on the level with said detent when said cup rests on said ring, so constructed and arranged that with said cup resting on said ring it can be rotated bringing said detent into alignment with the inner end of said screw so that said screw can be tightened against said detent holding it in an inoperative position releasing said rod and piston for movement relative to said cup and sleeve.

SAMUEL L. THOMAS.

References Cited in the file of this patent

UNITED STATES PATENTS

| Number | Name | Date |
|---|---|---|
| 192,011 | Richardson | June 12, 1877 |
| 792,380 | Albo | June 13, 1905 |
| 1,156,814 | Reed | Oct. 12, 1915 |
| 1,908,813 | Blaho | May 16, 1933 |
| 2,158,704 | Ligon | May 16, 1939 |
| 2,204,730 | Eskilson | June 18, 1940 |
| 2,313,213 | Atherley | Mar. 9, 1943 |
| 2,328,995 | Olds | Sept. 7, 1943 |
| 2,487,825 | Olvis | Nov. 15, 1949 |